(No Model.)

J. C. JEWETT.
COMBINED FILTER AND COOLER.

No. 330,404. Patented Nov. 17, 1885.

Witnesses:
M. Stark
Willie O. Stark

Inventor:
John C. Jewett
by Michael J. Stark
Attorney.

UNITED STATES PATENT OFFICE.

JOHN C. JEWETT, OF BUFFALO, NEW YORK.

COMBINED FILTER AND COOLER.

SPECIFICATION forming part of Letters Patent No. 330,404, dated November 17, 1885.

Application filed August 14, 1885. Serial No. 174,368. (No model.)

*To all whom it may concern:*

Be it known that I, JOHN C. JEWETT, of Buffalo, in the county of Erie and State of New York, have invented certain new and useful Improvements on a Combined Filter and Cooler; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in a combined filter and cooler; and it consists, essentially, in the novel and peculiar combination of parts and details of construction, as hereinafter first fully set forth and described, and then pointed out in the claims.

Figure 1:
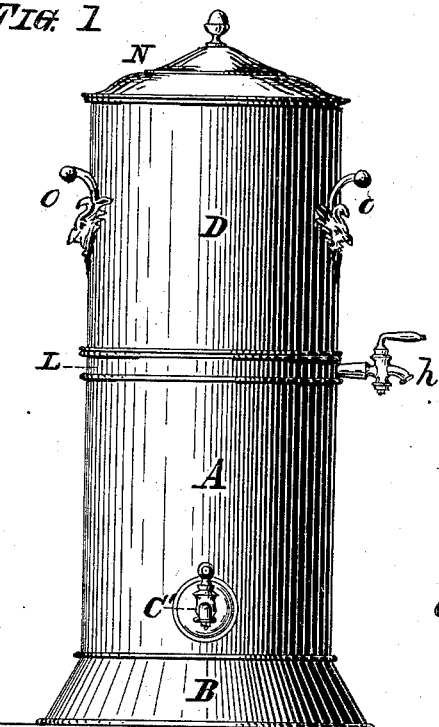
Figure 2:
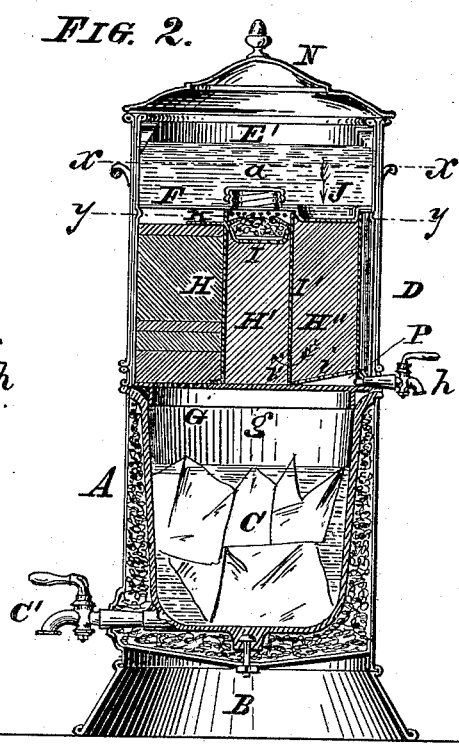
Figure 3:
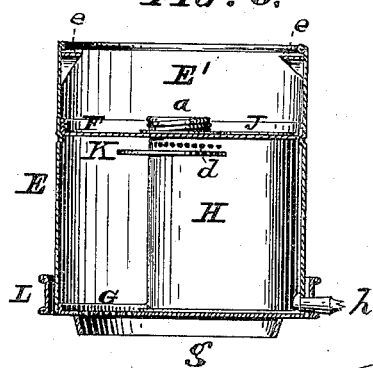
Figure 4:
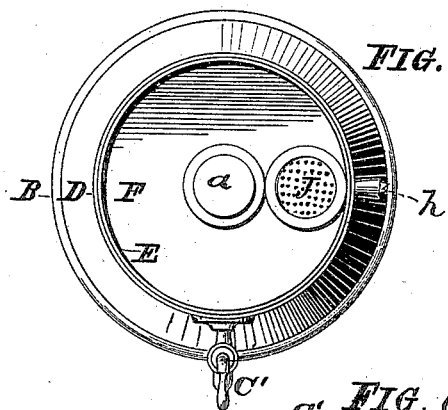
Figure 5:
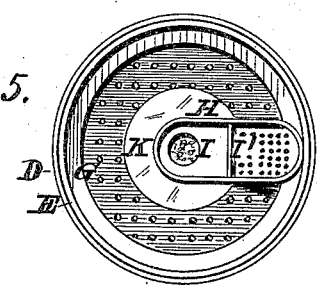
Figure 6:
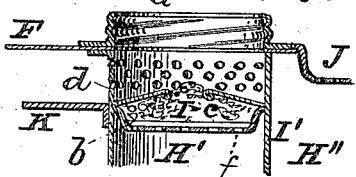

In the drawings already referred to, which serve to illustrate my said invention more fully, Figure 1 is a front elevation of my improved combined filter and water-cooler. Fig. 2 is a longitudinal sectional elevation of the same. Fig. 3 is a similar view of the filter detached and empty. Fig. 4 is a plan in line $x\ x$ of Fig. 2. Fig. 5 is a like view in line $y\ y$ of said Fig. 2, and Fig. 6 is a longitudinal sectional elevation of a portion of the gravel-cup detached.

Like parts are designated by corresponding letters of reference in all the figures.

The object of my present invention is the production of an efficient and durable filter and water-cooler combined, one in which the gravel-cup, being that portion of a filter most easily subject to derangement, may be readily cleaned and renewed at a moment's time and at but a trifling expense. To attain this result I construct my present apparatus substantially of a cooler-shell, A, having a suitable rim or base, B, and a water-reservoir, C, provided with a faucet, C', to enable the filtered and cooled water being drawn off, said reservoir C being constructed, preferably, of cast-iron, porcelain lined, in the usual manner, and the space between said shell A and the reservoir C "packed" with a poor conductor of heat—such as fine charcoal, &c.—in a manner readily understood.

The filter consists, essentially, of the shell D, being in the present instance a perfectly separate and independent piece, and the shell E, having on its lower end a perforated bottom, G, and a rim, $g$, and at a suitable distance below its upper edge a diaphragm, F, the space in said vessel E above the said diaphragm F being, in fact, the water-receiver, while the space between said diaphragm and the bottom G serves to receive the filtering-strata, as hereinafter to be more particularly referred to. In this space there is an oblong receptacle, H, serving as a "gravel-cup," so called, it having a vertical partition, I', to divide the space inside of the receptacle H into two chambers, H' and H'', as clearly indicated in Figs. 6 and 2. In the lower portion of this partition there are a number of perforations, $i'$, Fig. 2, serving to establish communication between the chambers H' H'', while in the bottom of the chamber H'' there is an inclined perforated bottom, $i$, to produce in said chamber H'' a small compartment, P, (see Fig. 2,) from which a faucet, $h$, carries off whatever sediment or liquid may settle in said compartment P. In the upper end of the compartment H'' there is a perforated cup, J, through which the water to be filtered gains admission to the gravel-cup, while in the upper end of the chamber H' there is a sponge-cup, I, having a perforated bottom covered by a layer of cheese-cloth or similar open woven textile fabric, $b$, Fig. 6, access to said sponge-cup being had through a screw-cap, $a\ a'$, as clearly illustrated in the drawings. Directly underneath the diaphragm F the chamber H' has a series of perforations, $d$, and underneath these perforations an externally-projecting flange or collar, K. In the shell E there are two ears or handles, $e$, Fig. 3, and on the exterior of the shell D there are two handles, O O, whereby these vessels may be readily handled and carried about. In the lower end of the shell D there is provided a notch (not shown) fitting the shank of the faucet $h$; but, if desired, this notch may be discarded, and in place thereof the shell D somewhat shortened, and a narrow band, L, permanently affixed to the said shell E, whereby said band forms a continuation of said shell D, for the object hereinafter to be mentioned.

In operation the water to be filtered and cooled is placed into the receiver E', from which it passes through the cup J into and through a stratum of gravel, charcoal, or other filtering material placed into the chamber H″. Thence it passes through the perforations i′ in the partition I′ upward into and through the chamber H′ and the gravel, &c., placed therein, escaping through the cheese-cloth c and sponge in the sponge-cup I, and the perforations d in the shell H into the filter-apartment proper.

The filter-bed proper consists of a series of layers in the following order: First, and on top, there is a layer of fine sand, then charcoal, then sand, fine and finally coarse gravel, said strata being clearly indicated in Fig. 2. Through these layers the water passes downward, and passing through the perforated bottom G falls into the cooler C. In its passage through these various strata the slime and coarsest sediments are deposited in the compartment P, from which they may and ought to be from time to time removed by frequently opening the faucet h, while other impurities are retained in the sponge and cheese-cloth contained in the sponge-cup I, which sponge and cloth may also be readily removed and frequently cleansed, so that when the water finally reaches the filtering-bed it is already in such a pure state as to leave but little sediment or impurities in this bed, the result of which is that the filter-strata will remain pure and sweet a much longer space of time and need replenishing at much longer intervals than is now the case with any filter with which I am acquainted.

When it is desired to cleanse the gravel-cup H, the cap a is removed and the sponge and cheese-cloth withdrawn, after which clean water is introduced into the reservoir E′ and the faucet h opened, when the said water will thoroughly wash said gravel and render it again serviceable.

To prevent the water escaping through the perforations d from running down the shell H, and thereby prevent its passing through the filter-bed, I provide said shell with a lateral flange or collar, K, over which the said water passes and then discharges nearly into the center of the stratum.

To prevent the faucet h from being opened, except for the purpose of withdrawing sediments from the compartment P, it is desirable that such faucet be placed into a position with reference to the proper faucet C′ where it cannot be readily reached; but since the ornamentation of the shell D always faces the faucet C′, (there being, in fact, always a "front" to these filters and coolers which is more highly ornamented than the reverse side,) a notch in said shell D for the passage of the faucet h would always place this faucet into but one position, which may not always be one readily accessible. To overcome this objection, a portion of the shell D—viz., the band L—may be permanently affixed to the vessel E, which passes the faucet h, so that the said vessel E and its accessories may be placed into any position relative to the faucet C′ and the face of the filter and cooler.

The shell D is made an independent and separate part of the apparatus, because it being highly ornamented can always be retained even if the entire filter is being renewed—a feature which has become a necessity, because the owners of the apparatus do not always desire to invest a large amount of money in repairs on filters.

Having thus fully described my invention, I claim as new and desire to have secured to me by Letters Patent of the United States—

1. In a combined filter and cooler, an independent shell for said filter, in combination with the filtering-vessel and a narrow band permanently affixed to said filtering-vessel, said band forming a continuation of the independent shell, as and for the object stated.

2. In a combined filter and cooler, an oblong gravel-cup, H, having perforated partition I′, a perforated receiving-cup, J, and a sponge-cup, I, said sponge-cup being located with reference to the gravel-cup, substantially as and for the purpose indicated.

3. In a filter, the combination, with the gravel-cup, of a sediment-apartment, P, having draw-off faucet h, as and for the purpose specified.

4. The combination, with the vessel E, having the perforated bottom G and the diaphragm F, of the oblong gravel-cup H, having the perforated partition I′, the perforated bottom i, apartment P, and faucet h, and the filter-strata, substantially as and for the object mentioned.

5. The combination, with the gravel-cup H, having the perforated bottom, of a filling consisting of a layer of cheese-cloth and a sponge, as and for the purpose indicated.

6. The combination, in a filter, of the shell E, having perforated bottom G and diaphragm F, the gravel-cup H, with perforations d, and the laterally-projecting collar K, as specified.

In testimony that I claim the foregoing as my invention I have hereto set my hand in the presence of two subscribing witnesses.

JNO. C. JEWETT.

Attest:
MICHAEL J. STARK,
JESSIE A. TULLEY.